United States Patent [19]

Easley et al.

[11] Patent Number: 4,860,534

[45] Date of Patent: Aug. 29, 1989

[54] INLET PARTICLE SEPARATOR WITH ANTI-ICING MEANS

[75] Inventors: Sydney E. Easley; Craig E. Heathco, both of Indianapolis; Clayton L. Smith, Brownsburg, all of Ind.

[73] Assignee: General Motors Corporation, Detroit, Mich.

[21] Appl. No.: 235,586

[22] Filed: Aug. 24, 1988

[51] Int. Cl.[4] .............................................. F02G 3/00
[52] U.S. Cl. .............................. 60/39.092; 60/39.093; 415/169.1; 55/306; 244/53 B
[58] Field of Search ............ 60/39.091, 39.092, 39.093; 55/306; 244/53 B, 121, 134 K, 134 B; 415/121 A, 168, 115, 178

[56] References Cited

U.S. PATENT DOCUMENTS

| | | | |
|---|---|---|---|
| 2,600,302 | 6/1952 | Kinsella | 244/134 R |
| 3,015,937 | 1/1962 | Giliberty | 415/116 |
| 3,925,979 | 12/1975 | Ziegler | 244/134 R |
| 3,978,656 | 9/1976 | Murphy | 55/306 |
| 4,268,284 | 5/1981 | Kent et al. | 60/39.092 |
| 4,509,962 | 4/1985 | Breitman et al. | 244/53 B |
| 4,527,387 | 7/1985 | Lastrina et al. | 55/306 |
| 4,685,942 | 8/1987 | Klassen et al. | 244/53 B |
| 4,688,745 | 8/1987 | Herman | 60/39.093 |
| 4,702,071 | 10/1987 | Jenkins et al. | 60/39.092 |
| 4,704,145 | 11/1987 | Norris et al. | 55/306 |

Primary Examiner—Louis J. Casaregola
Assistant Examiner—Timothy S. Thorpe
Attorney, Agent, or Firm—Saul Schwartz

[57] ABSTRACT

A gas turbine engine inertial inlet particle separator having anti-icing. The separator has inner and outer walls defining a main inlet channel and splitter walls dividing the main channel into inner and outer branches. At least one of the walls has a surface portion subject to icing and a partition on the separator is closely disposed behind the one wall to define therewith a narrow annular tunnel. An inlet passage ducts hot compressed air from the engine to one end of the narrow tunnel and a discharge passage ducts the hot compressed air from the other end of the tunnel to a discharge, the flow area of the tunnel being less than the flow area of at least one of the discarge and inlet passages so that the tunnel defines a high velocity, enhanced heat transfer segment of a heating air channel consisting of the tunnel and the inlet and discharge passages. Heat conducting bridges extend across the tunnel to further enhance heat transfer to the icing surface portion.

3 Claims, 2 Drawing Sheets

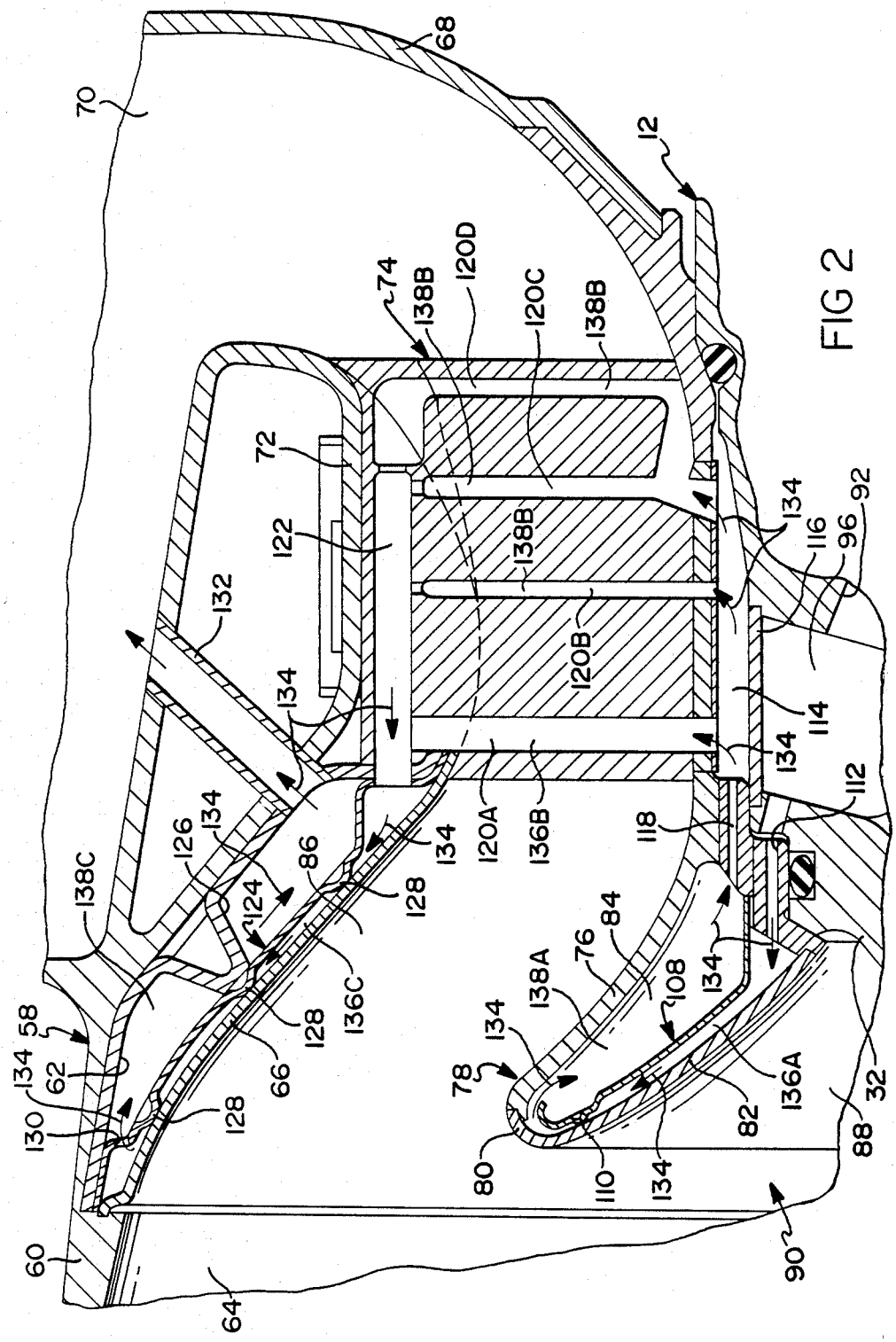

INLET PARTICLE SEPARATOR WITH ANTI-ICING MEANS The invention herein described was made in the course of work under a contract or subcontract thereunder with the Department of Defense.

FIELD OF THE INVENTION

This invention relates to inlet particle separators for aircraft propulsion gas turbine engines and, more particularly, to inlet particle separators having anti-icing protection.

BACKGROUND OF THE INVENTION

Gas turbine engines in helicopter propulsion applications, for example, are protected against ingestion of airborne debris by inertial type inlet particle separators. Such separators mount on the engine upstream of the usual annular compressor entry and have flowpath defining walls which change the direction of the airflow through the separator to disassociate debris from the air. To the end of avoiding ice deposits on the flowpath defining walls of the separator, it is known to fashion internal heating air channels in the separator which circulate hot compressed air from the engine behind the flowpath defining walls of the separator. To the extent that heat is transferred from the air in the heating air channels to portions of the separator not susceptible to icing, such as to internal structural walls or to portions of the flowpath defining walls not frontally exposed to the airstream, engine efficiency is sacrificed. An inlet particle separator according to this invention incorporates novel internal heating air channels which minimize consumption of hot compressed air from the engine by minimizing heat transfer to parts of the separator not susceptible to icing and maximizing heat transfer to patches or sections of the flowpath defining walls susceptible to icing.

SUMMARY OF THE INVENTION

This invention is a new and improved inlet particle separator for aircraft propulsion gas turbine engines wherein hot air from the compressor of the engine is circulated through internal heating air channels in the separator having low velocity segments behind non-icing walls of the separator and relatively faster flowing high velocity segments behind icing walls of the separator. The higher velocity of the heating air in the high velocity segments relative to the low velocity segments promotes relatively more heat transfer to the icing walls. The walls of the separator defining opposite sides of the high velocity segments of the heating air channels are interconnected by bridges which conduct still more heat from the remote side of the heating air channel to the icing wall.

BRIEF DESCRIPTION OF THE DRAWINGS

FIG. 2 is an enlarged view of a portion of FIG. 1.

DESCRIPTION OF A PREFERRED EMBODIMENT

Figure 1:
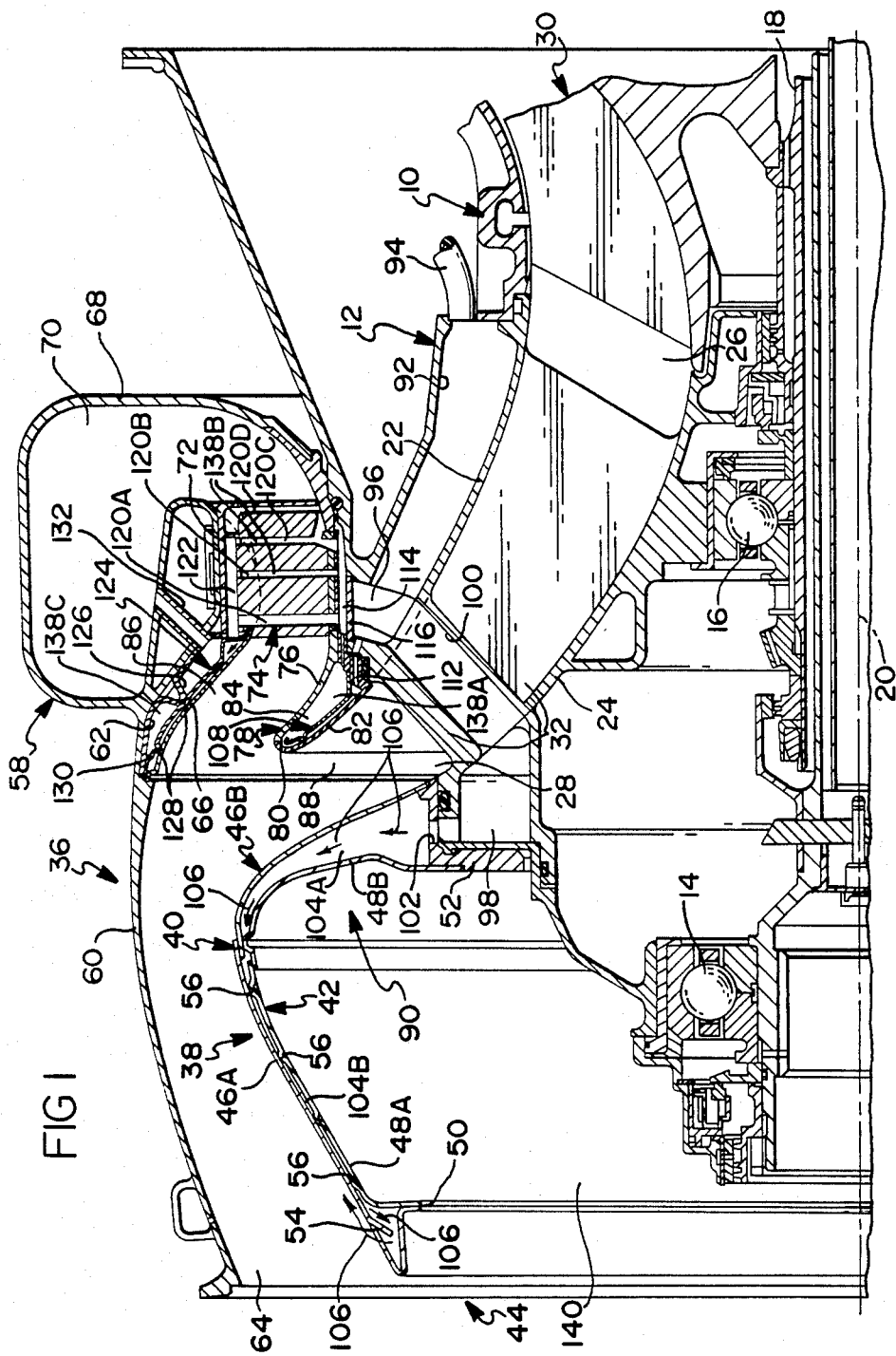
FIG. 1 is a fragmentary longitudinal sectional view of an inlet particle separator according to this invention.

Referring to FIG. 1 of the drawings, a fragmentarily illustrated gas turbine engine has an outer casing 10 to which is rigidly attached a front frame assembly 12. A front bearing 14 and an intermediate bearing 16 are each disposed between the front frame assembly and a rotor shaft 18 of the engine whereby the rotor shaft is supported on the front frame and on the casing for rotation about a main axis 20 of the engine.

The front frame assembly 12 has a generally annular outer wall 22 and generally annular inner wall 24 which define therebetween an annular compressor air flowpath 26 extending from a compressor air entry 28 at the upstream end of the flowpath to a centrifugal compressor rotor 30 rotatable with the shaft 18. The outer and inner walls 22 and 24 are rigidly interconnected by a plurality of radial struts which traverse the flowpath 26, only a representative strut 32 being illustrated. An inertial inlet particle separator 36 according to this invention is attached to the front frame 12 ahead or upstream of the compressor entry 28.

The inlet particle separator 36 has an annular inner wall 38 consisting of a first panel assembly 40 and a second panel assembly 42 joined to the first panel assembly at an inlet end 44 of the separator. The first panel assembly 44 includes a pair of annular plates 46A–B which overlap generally near the middle of the inner wall 38. The second panel assembly includes a pair of annular plates 48A–B which similarly overlap near the middle of the inner wall. At the inlet end 44, the annular plates 46A and 48A are joined at a flange 50. At the opposite end of the inner wall 38, the plates 46B and 48B are attached in spaced relationship to a base 52 attached to the front frame 12 radially inboard of the strut 32.

The annular plate 46A has a plurality of perforations therein near the inlet end 44 of the separator, only a representative perforation 54 being illustrated in FIG. 1. The annular plate 46A is plates 46A–B and 48A–B are preferably metal. The plate 48A has a plurality of dimples or protuberances 56 which bear against the adjacent or facing side of the plate 46A.

The inlet particle separator 36 further includes a housing 58 preferably constructed as a graphite/epoxy layup. The housing 58 has a wall 60 radially outboard of the inner wall 38 which extends aft from the inlet end 44 of the separator to an enlarged chamber 62 in the housing 58. The walls 60 and 38 define, respectively, outer and inner boundaries of an annular main inlet channel 64 extending aft from the inlet end 44 of the separator to a longitudinal location corresponding, generally, to the start of the chamber 62. The enlarged chamber 62 is closed by an annular metal plate 66 attached to the housing 58.

In addition to the wall 60 and the chamber 62, the housing 58 also has an annular scroll wall 68 in the general shape of a reverse C within which is defined a scroll chamber 70. The scroll wall 68 is attached to the front frame radially outboard of the strut 32. An annular inlet to the scroll chamber 70 is defined generally between an internal web 72 of the housing 58 and the radially innermost portion of the scroll wall 68. The annular inlet is traversed by an array of radially extending swirler vanes between the web 72 and the scroll wall 68, only a representative vane 74 being illustrated.

The scroll wall 68 extends forward of the vanes 74 toward the main inlet channel 64 and defines a first wall 76 of a splitter 78 of the inlet particle separator. The first wall 76 faces the plate 66 and terminates at a nose 80 of the splitter. A second wall 82 of the splitter 78 likewise terminates at the nose 80 and extends aft therefrom to the front frame 12 ahead of the strut 32 and in spaced relation to the first wall 76. An internal chamber 84 is thus defined within the splitter 78 between the first and second walls thereof. The second wall 82 faces the plate 46B of the inner wall 38.

The splitter 78 divides the main inlet channel 64 into a radially outer branch 86 between the first wall 76 and the plate 66 and a radially inner branch 88 between the second wall 82 and the plate 46B. The outer branch defines a flowpath between the main inlet channel and the scroll chamber entry. The inner channel defines a flowpath between the main inlet channel and the compressor entry 28.

When the rotor shaft 18 rotates, the low pressure zone developed behind the compressor entry 28 by the compressor 30 initiates a flow of air in the main inlet channel 64 from the inlet end 44 of the separator. The airflow proceed downstream toward the splitter 78 and negotiates the tortuous path between the inner wall 38 and the wall 60 into the inner branch 88. The struts 32 of the front frame remove any swirl of the inlet airstream as the same enters the compressor 30. The inertia of airborne debris in the airstream in the main inlet channel 64 prevents the debris from negotiating the tortuous path into the inner branch and carries the debris on into the outer branch 86 and then into the scroll chamber 70. The debris is discharged overboard from the scroll chamber by conventional means, not shown. The vanes 74 swirl the debris for more efficient disposal.

The plate 46A defines an annular surface patch on the inner wall 38 substantially frontally exposed to the airstream in the main inlet channel 64. Similarly, the second wall 82 of the splitter 78 and the plate 66 define surface patches substantially frontally exposed to the airstreams in, respectively, the inner and outer branches 88 and 86. To prevent ice formation on these frontally exposed surface patches, the inlet particle separator 86 has an anti-icing system 90.

The anti-ice system 90 includes a manifold chamber 92 in the front frame 12 connected by a duct 94 to a compressed air plenum of the engine, not shown, whereby the manifold chamber is pressurized with hot, compressed air from the compressor. The manifold chamber 92 opens into an outer plenum chamber 96 of the front frame 12. The outer plenum chamber communicates with an inner plenum chamber 98 of the front frame through a passage 100 in the strut 32.

An inlet orifice 102 in the base 52 of the inner wall 38 is open to the inner plenum chamber 98 and defines the entry or upstream end of a heating air channel of the separator 36 between the panel assemblies 40 and 42, the exit or downstream end being defined by the perforations 54 in the plate 46A. The plates 46B and 48B define an inlet passage for ducting heating air from the orifice 102 to the narrow annular tunnel defined between the plates 46A and 48A. The flow area of the inlet passage exceeds the flow area of the tunnel so that a low velocity segment 104A of the heating air passage is defined between the relatively widely spaced plates 46B and 48B and a high velocity segment 104B is defined at the tunnel between the relatively more closely spaced plates 46A and 48A. The airstream through the inner wall heating air channel is represented by a series of arrows 106, FIG. 1.

As seen best in FIG. 2, an annular partition 108 is disposed in the internal chamber 84 of the splitter closely behind the second wall 82 and defines therewith a narrow annular tunnel. The aft end of the partition 108 is attached to the splitter and the forward end, curved to conform to the nose 80, bears against the second wall 82 near the nose through a plurality of dimples or protuberances on the partition, only a representative dimple 110 being illustrated. An inlet orifice 112 in the splitter 78 communicates with the outer plenum chamber 96 in the front frame and opens into the internal chamber 84 of the splitter between the partition 108 and the second wall 82.

An annular chamber 114 is defined between the front frame 12 and the scroll wall 68 inboard of the vanes 74. The chamber 114 is separated from the outer plenum chamber 96 by a partition 116 and is connected by a passage 118 to the internal chamber 84 in the splitter between the partition 108 and the first wall 76. The portion of the internal chamber 84 between the partition 108 and the first wall 76 represents a discharge passage for ducting away airflow discharging from the narrow tunnel between the partition 108 and the second wall 82. The vanes 74 have a plurality of radially extending channels 120A-D therein each communicating at one end with the chamber 114 and at the other end with a collector 122. The flow area of the front channel 120A exceeds the flow areas of the other channels 120B-D.

A partition or baffle 124 is disposed in the enlarged chamber 62 in the housing 58 closely behind the plate 66 and defines therewith a narrow annular tunnel The partition 124 is attached at opposite ends to the housing 58 and is reinforced from behind by a support 126 on the housing 58. The partition 124 is closely spaced from the plate 66 and has a plurality of protuberances or dimples 128 thereon which bear against the plate 66. The collector 122 in the vane 74 opens into the enlarged chamber 62 at the aft end thereof between the partition 124 and the plate 66. A perforation 130 in the partition 124 near the front of the enlarged chamber 62 defines a flowpath between the portions of the enlarged chamber 62 on opposite sides of the partition. A pipe 132 on the housing opens into the scroll chamber 70 and into the enlarged chamber 62 on the side of partition 124 opposite plate 66. The portion of the enlarged chamber 62 on the side of partition 124 opposite plate 66 represents a discharge passage for ducting away airflow discharging from the narrow tunnel between the partition 124 and the plate 66.

The inlet orifice 112 defines the entry to a second heating air channel of the inlet particle separator which extends from the orifice 112 to the end of pipe 132 in the scroll chamber 70. The airstream in the aforesaid second heating air channel is represented by a series of arrows 134, Figure Z. The second heating air channel has a plurality of high velocity segments 136A-C defined, respectively, between the partition 108 and the second wall 82 of the splitter, through the vane passage 120A, and between the partition 124 and the plate 66. The second heating air channel also has a plurality of low velocity segments 138A-C defined, respectively, between the partition 108 and the first wall 76 of the splitter, through the vane passages 120B-D, and in the enlarged chamber 62 in the housing 58 on the opposite side of the partition 124 from the plate 66.

The anti-icing system of the inlet particle separator 36 embodies two mechanisms for maximizing heat transfer to where ice formation is most likely, i.e., the plates 46A and 66, the nose 80 and the second wall 82 of the splitter, and the leading edge of the vane 74. The first mechanism is increasing and decreasing the velocity of the heating air in the heating air channels in accordance with heat transfer requirements. For example, the airstream represented by arrows 106 in the first heating air channel flows faster in the high velocity segment 104B than in the low velocity segment 104A because the flow area of the high velocity segment is less than the flow area of the low velocity segment. Accordingly, more heat is transferred to the plates 46A and 48A than to the plates 46B and 48B where heating to prevent icing is not necessary. Similarly, the airstream represented by arrows 134 in the second heating air channel flows faster in each of the high velocity segments 136A-C than in respective ones of the low velocity segments 138A-C upstream thereof so that heat transfer is concentrated at the nose 80 and second wall 82, at the leading edge of the vane 74, and at the plate 66.

The second mechanism for maximizing heat transfer is physically bridging the high velocity segments of the heating air channels to provide a conductive path for heat transfer from the side of the high velocity segment not susceptible to icing to the side which is susceptible to icing. For example, heat transfer is enhanced to the plate 48A forming one side of the high velocity segment 104B of the first heating air channel but that plate faces a stagnant zone 140 in the center of the inner wall 38 and is not subject to icing. The dimples 56 on the plate 48A bear against the plate 46A and define bridges which conduct heat from the plate 48A where it is not needed to the plate 46A where it is needed. Similarly, the dimples 110 and 128 on the partitions 108 and 124, respectively, bridge the high velocity segments 136A and 136C and conduct heat from the partitions, where it is not needed, to the second wall 82 and to the plate 66 where it is needed.

The embodiments of the invention in which an exclusive property or privilege is claimed are defined as follows:

1. On a gas turbine engine having a source of hot compressed air and an annular compressor entry,
   an inlet particle separator comprising:
   an annular inner wall,
   an annular outer wall around said inner wall and cooperating therewith in defining a main inlet channel having an inlet at one end,
   a splitter in said main channel having a first wall facing said annular outer wall and defining therewith an annular outer branch between said main inlet channel and a scroll chamber of said separator and a second wall facing said annular inner wall and defining therewith an annular inner branch between said main inlet channel and said compressor entry and a nose connecting said inner and said outer walls,
   means defining a surface portion on one of said inner and said outer walls and said first and said second walls generally frontally exposed to an airstream in a corresponding one of said main inlet channel and said inner and said outer branches,
   a partition on said separator cooperating with said one of said inner and said outer walls and said first and said second walls in defining an annular tunnel behind said surface portion,
   means defining a heating air inlet passage connecting an upstream end of said annular tunnel to said source of hot compressed air,
   means defining a heating air discharge passage connecting a downstream end of said annular tunnel to a discharge so that a heating air channel is defined between said inlet and said discharge for flow of hot compressed air from said source,
   one of said heating air inlet and said heating air discharge passages having a flow area exceeding the flow area of said annular tunnel so that said annular tunnel defines a high velocity segment of said heating air channel and said one of said heating air inlet and said heating air discharge passages defines a low velocity segment of said heating air channel, and
   means defining a heat conducting bridge across said annular tunnel between said partition and said one of said inner and said outer walls and said first and said second walls.

2. The inlet particle separator recited in claim 1 wherein
   said means defining a heat conducting bridge includes a plurality of protuberances on one of said partition and said one of said inner and said outer walls and said first and said second walls bearing against the other.

3. The inlet particle separator recited in claim 2 wherein
   said means defining a surface portion on one of said inner and said outer walls and said first and said second walls generally frontally exposed to an airstream in a corresponding one of said main inlet channel and said inner and said outer branches is a metal plate supported on a composite graphite/epoxy portion of said one of said inner and said outer walls and said first and said second walls.

* * * * *